United States Patent
Suzuki et al.

(10) Patent No.: US 9,750,085 B2
(45) Date of Patent: Aug. 29, 2017

(54) APPARATUS AND METHOD FOR CONTROLLING VEHICLE

(75) Inventors: Keisuke Suzuki, Fujisawa (JP); Yuki Nakajima, Yokohama (JP); Naoki Ueda, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 1052 days.

(21) Appl. No.: 13/996,886

(22) PCT Filed: Nov. 22, 2011

(86) PCT No.: PCT/JP2011/076902
§ 371 (c)(1),
(2), (4) Date: Jun. 21, 2013

(87) PCT Pub. No.: WO2012/086355
PCT Pub. Date: Jun. 28, 2012

(65) Prior Publication Data
US 2013/0270249 A1    Oct. 17, 2013

(30) Foreign Application Priority Data
Dec. 24, 2010    (JP) ................................. 2010-286885

(51) Int. Cl.
| | |
|---|---|
| *H05B 1/02* | (2006.01) |
| *B60H 1/14* | (2006.01) |
| *B60H 1/22* | (2006.01) |
| *H01M 10/625* | (2014.01) |
| *H01M 10/66* | (2014.01) |

(52) U.S. Cl.
CPC ........... *H05B 1/0227* (2013.01); *B60H 1/143* (2013.01); *B60H 1/2218* (2013.01); *H01M 10/625* (2015.04); *H01M 10/66* (2015.04)

(58) Field of Classification Search
CPC ..... B60H 1/143; B60H 1/2218; H01M 10/66; H01M 10/625; H05B 1/0227
USPC ........... 219/202, 200, 201; 62/239; 340/901; 340/425.5; 165/104.28
See application file for complete search history.

(56) References Cited

U.S. PATENT DOCUMENTS 5,565,755 A * 10/1996 Keith ........................ B60L 1/08
                                                     219/202
6,454,180 B2    9/2002 Matsunaga et al.
(Continued)

FOREIGN PATENT DOCUMENTS

| JP | 5-238245 A | 9/1993 |
|---|---|---|
| JP | 5-270247 A | 10/1993 |

(Continued)

*Primary Examiner* — Dana Ross
*Assistant Examiner* — Kuangyue Chen
(74) *Attorney, Agent, or Firm* — Foley & Lardner LLP

(57) ABSTRACT

An apparatus for controlling a vehicle, which includes: a battery (3) capable of being charged from an external power source (EPS); a power generation unit (PGU) capable of charging the battery (3); an electric heater (12) configured to produce heat with electric power from an electric power source; a heater core (11) configured to heat air by using any one of waste heat from the power generation unit (PGU) and the electric heater (12); and a controller (19) configured to perform control for selectively using the waste heat from the power generation unit (PGU) and the electric heater (12) as a heat source of the heater core (11) when the vehicle is parked.

8 Claims, 9 Drawing Sheets

(56) References Cited

U.S. PATENT DOCUMENTS

| | | | |
|---|---|---|---|
| 2001/0018832 A1* | 9/2001 | Matsunaga | B60H 1/00485 62/239 |
| 2006/0132101 A1* | 6/2006 | Ambrosio | B60L 11/1855 320/150 |
| 2008/0117079 A1* | 5/2008 | Hassan | B60R 25/045 340/901 |
| 2009/0133646 A1* | 5/2009 | Wankhede | B60H 1/14 123/41.31 |
| 2009/0288816 A1* | 11/2009 | Reeve | B60H 1/00371 165/203 |
| 2012/0090905 A1 | 4/2012 | Vollmer et al. | |

FOREIGN PATENT DOCUMENTS

| | | |
|---|---|---|
| JP | 8-230441 A | 9/1996 |
| JP | 2001-315524 A | 11/2001 |
| JP | 2004-146144 A | 5/2004 |
| JP | 2006-59573 A | 3/2006 |
| JP | 2008-296646 A | 12/2008 |
| JP | 2008296646 A * | 12/2008 |
| JP | 2010-23532 A | 2/2010 |
| JP | 2010023532 A * | 2/2010 |
| WO | WO 2010/081597 A1 | 7/2010 |

* cited by examiner

APPARATUS AND METHOD FOR CONTROLLING VEHICLE

TECHNICAL FIELD

The present invention relates to an apparatus and hod for controlling a vehicle including an electric air-conditioning heat source.

BACKGROUND ART

Patent Literature 1 discloses a technique for an electric automobile including an air-conditioning device which uses electric heating means or the like, the technique being for performing space-preheating while the automobile is being charged.

CITATION LIST

Patent Literature

Patent Literature 1: Japanese Patent Application Laid-open Publication No. H8(1996)-230441

SUMMARY OF INVENTION

Technical Problem

However, the technique above performs the space-preheating using only electric power from a power source. Hence, when for example the outside-air temperature is low, sufficient energy for heating air may not be able to be supplied, which hinders sufficient space-heating.

The present invention has been made focusing on the above problem, and has an objective to provide an apparatus for controlling vehicle capable of accomplishing sufficient space-heating.

Solution to Problem

A first aspect of the present invention is an apparatus for controlling a vehicle. This controlling apparatus includes: a battery capable of being charged from an external power source; a power generation unit capable of charging the battery; an electric heater configured to produce heat with electric power from an electric power source; a heater core configured to heat air by using any one of waste heat from the power generation unit and the electric heater; and a controller configured to perform control for selectively using the waste heat from the power generation unit and the electric heater as a heat source of the heater core when the vehicle is parked.

A second aspect of the present invention is a method for controlling a vehicle. This controlling method includes: providing a battery capable of being charged from an external power source, a power generation unit capable of charging the battery, an electric heater configured to produce heat with electric power from an electric power source, and a heater core configured to heat air by using any one of waste heat from the power generation unit and the electric heater; and performing control for selectively using the waste heat from the power generation unit and the electric heater as a heat source of the heater core when the vehicle is parked.

DESCRIPTION OF EMBODIMENTS

Figure 1:
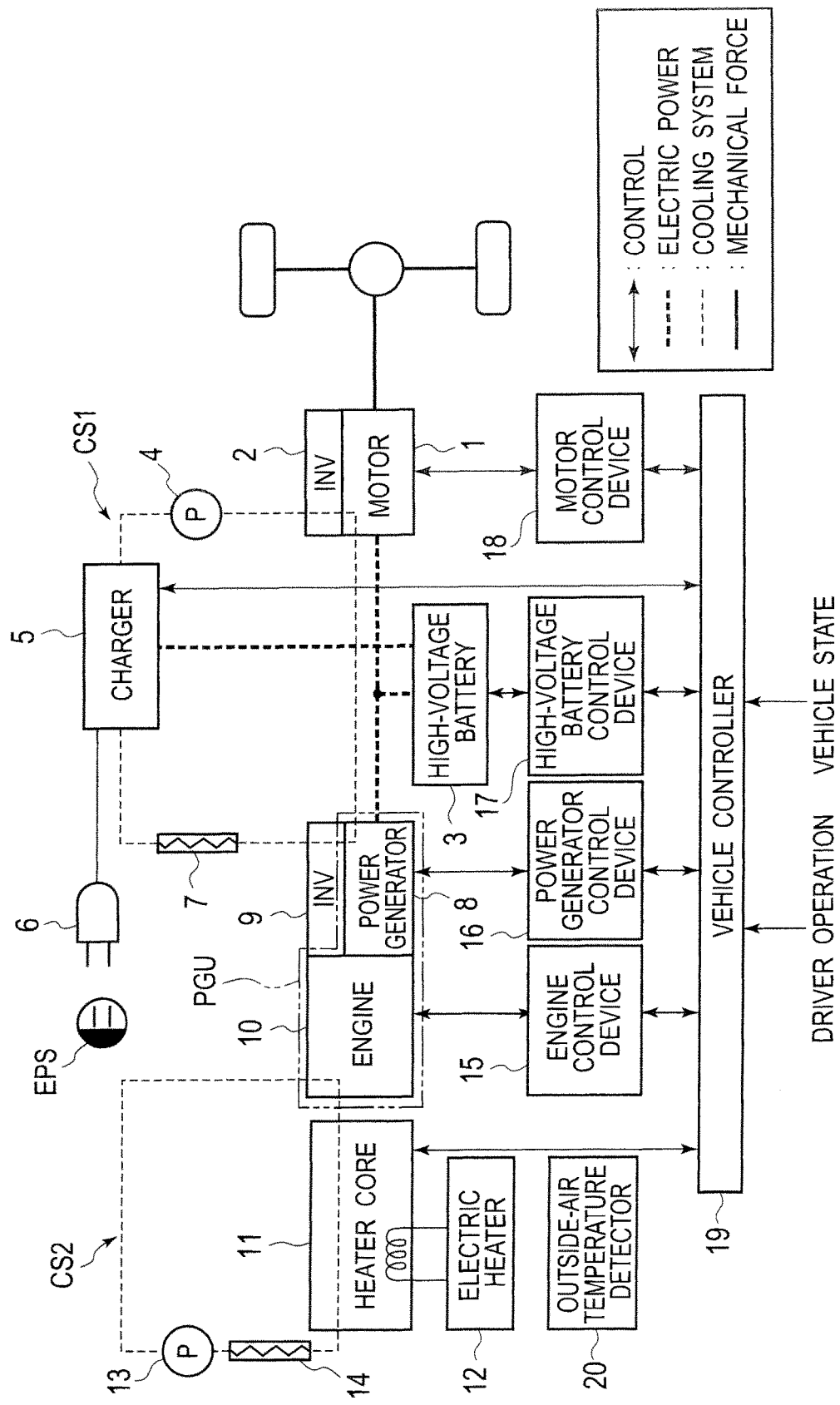
FIG. 1 is a schematic diagram illustrating an electric automobile equipped with power generation unit according to an embodiment of the present invention.

FIG. 1 is a schematic diagram illustrating an electric automobile equipped with power generation unit, which corresponds to a vehicle, according to an embodiment of the present invention. As the power generation unit, a power generation unit PGU which is a combination of an engine 10, being an internal combustion engine, and a power generator 8 is used herein. However, the power generation unit may be of a different type, such as a fuel cell power generating system. A drive motor 1 drives the electric automobile. An inverter 2 receives electric power from a high-voltage battery 3 (corresponding to a battery) and/or the power generation unit PGU, and supplies drive power to the drive motor 1. The high-voltage battery 3 is a battery capable of being charged from an internal power source (the power generation unit PGU) or an external power source EPS. A high-voltage battery control device 17 is configured to detect the state of and control the high-voltage battery 3 and also to exchange information with a vehicle controller 19 and the like to be described later. The high-voltage battery 3 and the high-voltage battery control device 17 play a role of supplying power for driving the drive motor 1 and also absorbing power generated by the power generator 8 of the power generation unit PGU and power regenerated by the drive motor 1 upon deceleration.

A cooling system CS1 for heavy-current devices circulates water to for example high-voltage components (heavy-current devices), such as the drive motor 1, a charger 5, the power generator 8, the inverter 2, and an inverter 9, and includes at least a coolant water pump 4 and a radiator for heavy-current devices 7. The coolant water pump 4 circulates water for cooling the heavy-current devices mentioned above, and the radiator for heavy-current devices 7 cools the water for cooling the heavy-current devices.

The charger 5 is configured to receive power from the external power source EPS and charge the high-voltage battery 3. A connecting device 6 is a plug for connecting the charger 5 to the external power source EPS for system power. The external power source EPS may be a household electrical outlet or a plug-in station for electric automobiles.

The power generator 8 is configured to generate power in combination with the engine 10. The inverter 9 is configured to, with the engine 10 as load for example, drive the power generator 8 with power received from the high-voltage battery 3. The engine 10 is an internal combustion engine for power generation.

An engine cooling system CS2 is a system for circulating coolant water to the engine 10 to cool it, and includes at least a coolant water pump 13, a radiator for engine 14, and a heat core 11. The coolant water pump 13 circulates engine coolant water, and the radiator for engine 14 cools the engine coolant water.

The heat core 11 is a heat source for performing space-heating, and is structured to be capable of heating air for space-heating by use of, as the heat source, one or both of heat of the coolant water for the engine 10 (corresponding to waste heat from the power generation unit PGU) and heat from an electric heater 12. The electric heater 12 is an electric heat source for performing space-heating by use of electric energy, and is configured to produce heat with power from an electric source such as, for example, the external power source EPS, the high-voltage battery 3, or the power generation unit PGU.

An engine control device 15 is a control device for controlling the engine 10, and is configured to control parameters for the engine 10, such as fuel consumption, intake air mass, and ignition timing, based on information from various sensors and instructions from the vehicle controller 19 to be described later.

A power generator control device 16 is a control device for controlling the power generator 8, and is configured to appropriately control the power generator 8 according to instructions from the vehicle controller 19 to be described later, based on a power generation state of power generation and an operation state such as a consumption state of power consumed with the engine 10 as load.

The motor control device 18 is a motor control device configured to control the drive motor 1, and controls the drive motor 1 according to instructions from the vehicle controller 19 to be described later, based on an operation state of the vehicle such as a power running state in which the vehicle runs by outputting torque or a regeneration state in which energy is absorbed by the high-voltage battery 3 upon deceleration.

The vehicle controller 19 is a controller configured to perform overall control of the vehicle based on, for example, an operation input made by the driver, environmental information such as an outside-air temperature detected by an outside-air temperature detector 20, a vehicle state such as a vehicle speed, an ON/OFF state of a parking brake or a parking lock, and signals from the control devices described above. The vehicle controller 19 outputs to the motor control device 18 a signal for driving the drive motor 1 as requested by the driver, and also reads, for example, the state of charge (SOC) of the high-voltage battery 3 detected by the high-voltage battery control device 17. Then, the vehicle controller 19 controls the engine 10 and the power generator 8 via the engine control device 15 and the power generator control device 16 so that they generate power to make the state of charge appropriate for a current operation state of the vehicle or a future travelling plan.

Moreover, when the vehicle being parked is charged from the external power source EPS, the vehicle controller 19 monitors the state of the high-voltage battery 3 via the high-voltage battery control device 17 and controls the charger 5 so that the high-voltage battery 3 may be charged with an appropriate amount of power. Further, when the driver requests space-heating, the vehicle controller 19 controls the heater core 11 to use heat energy from an engine coolant water and/or heat from the electric heater 12 to accomplish an appropriate space-heating state.

Figure 2:
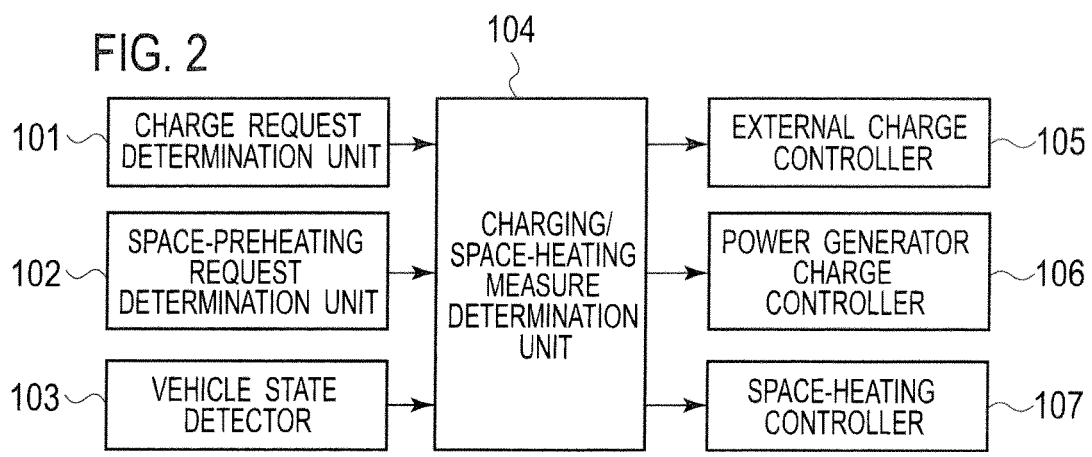
FIG. 2 is a schematic diagram illustrating the control configuration of the electric automobile in FIG. 1.

FIG. 2 is a schematic diagram showing the control configuration of the electric automobile equipped with power generation unit according to the embodiment of the present invention. A charge request determination unit 101 determines whether a charge request is made by the driver or not and the content of the request. A space-preheating request determination unit 102 determines whether a space-preheating request is made by the driver or not and the content of the request (including a driver's intension for space-preheating and an estimated space-preheating completion time based thereon). A vehicle state detector 103 detects states of the entire vehicle, including for example environmental information such as an outside-air temperature and ON/OFF states of the parking brake and parking lock.

A charging/space-heating measure determination unit 104 determines measures for charging and space-heating based on a result of the determination by the charge request determination unit 101, a result of the determination by the space-preheating request determination unit 102, and a result of the determination by the vehicle state detector 103. An external charge controller 105 controls charging by the external power source EPS (external charge) based on an output from the charging/space-heating measure determination unit 104. A power generator charge controller 106 performs charging using the power generator 8 (power generator charge) based on an output from the charging/space-heating measure determination unit 104. A space-heating controller 107 controls space-heating based on an output from the charging/space-heating measure determination unit 104.

The electric automobile equipped with power generation unit is a vehicle which can be charged and heated by the external power source EPS and which also can be charged and heated by the internal power source such as the power generator 8 (the power generation unit PGU) driven by the engine 10. In such a vehicle, if charging and space-heating are performed always with the external power source EPS even when it is more efficient to use the internal power source than to use the external power source EPS, charging efficiency or space-heating efficiency may be lowered, or the energy cost may be increased. Moreover, if space-preheating is performed using only electric power from the power source when, for example, the outside-air temperature is low, sufficient energy for heating the air may not be able to be obtained, which hinders sufficient space-heating.

In this embodiment, the vehicle controller 19 performs processing for controlling charging and space-heating to be described below. Thereby, highly efficient charging and space-heating as well as cost reduction are accomplished, and sufficient space-heating is accomplished even when the outside-air temperature is low.

<Processing for Controlling Charging and Space-Heating>

Figure 3:
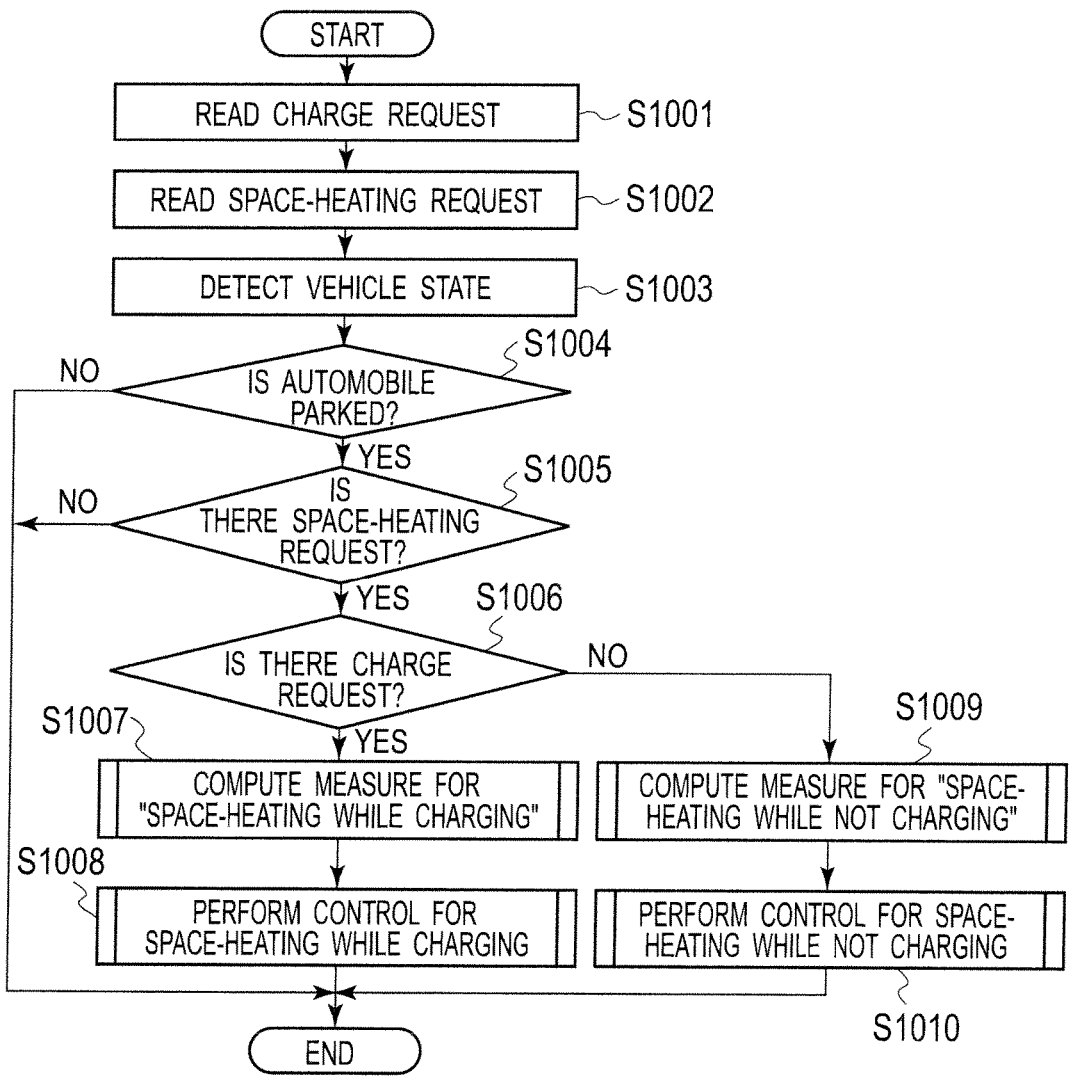
FIG. 3 is a flowchart illustrating processing for controlling charging and space-heating according to the embodiment of the present invention.

FIG. 3 is a flowchart showing the processing for controlling charging and space-heating according to the embodiment of the present invention.

In the processing for controlling charging and space-heating, the vehicle controller 19 reads an operation by the driver, settings, and the like in Step S1001 and subsequent Step S1002. Specifically, the vehicle controller 19 reads a charge request from the driver in Step S1001 and reads a space-heating request from the driver in Step S1002. The operation by the driver, settings, and the like read in Step S1001 and Step S1002 include, for example, date and time of next departure, a set interior temperature, and the like. In Step S1003, the vehicle controller 19 detects environmental information such as an outside-air temperature and a vehicle state such as an ON/OFF state of the parking brake or parking lock.

In Step S1004, the vehicle controller 19 determines whether the vehicle is parked or not based on the vehicle state detected in Step S1003. The vehicle controller 19 proceeds the processing to Step S1005 if determining that the vehicle is parked, and ends the processing if determining that the vehicle is not parked.

In Step S1005, the vehicle controller 19 determines whether there is a space-heating request or not based on the driver operation, settings, or the like read in Step S1002. The vehicle controller 19 proceeds the processing to Step S1006 if determining that there is a space-heating request, or ends the processing if determining that there is no space-heating request.

In Step S1006, the vehicle controller 19 determines whether there is a charge request or not based on the driver operation, settings, or the like read in Step S1001. The vehicle controller 19 proceeds the processing to Step S1007 if determining that there is a charge request, or proceeds the processing to Step S1009 if determining that there is no charge request.

The vehicle controller 19 computes a measure for achieving "space-heating while charging" in Step S1007, then controls the space-heating while charging based on the space-heating measure computed in Step S1007, and thereafter ends the processing.

In Step S1009, the vehicle controller 19 computes a measure for achieving "space-heating while not charging" based on the determination result in Step S1006 that there is no charging request. In subsequent Step S1010, the vehicle controller 19 controls the space-heating while not charging based on the space-heating measure computed in Step S1009, and ends the processing.

<Processing for Computing Space-Heating Measure>

Figure 4:
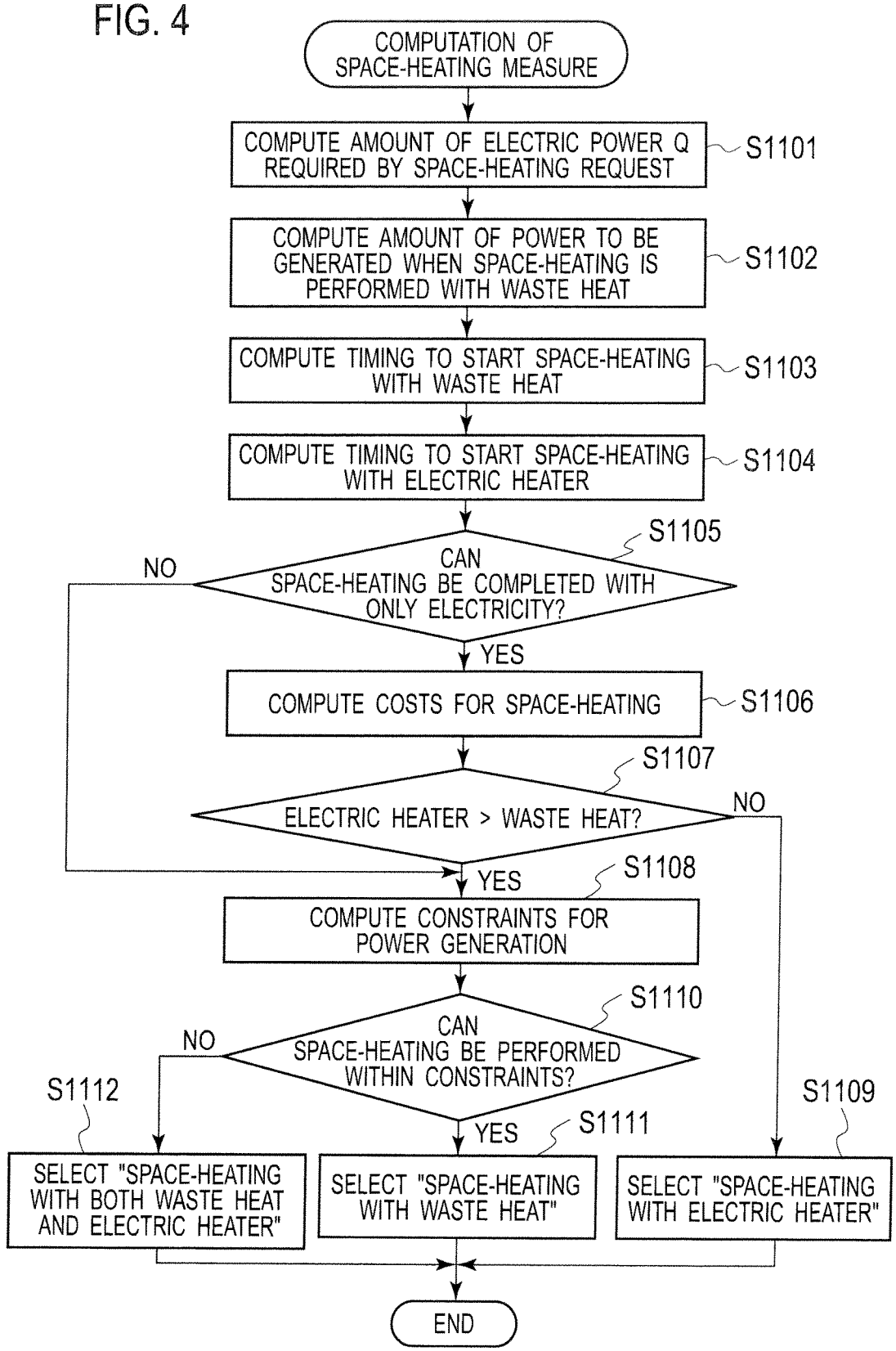
FIG. 4 is a flowchart illustrating processing for computing space-heating measure in FIG. 3.

FIG. 4 is a flowchart showing processing for computing a space-heating measure according to the embodiment of the present invention. Specifically, the flowchart shows the computation of the space-heating measure performed in Step S1007 and Step S1009 in FIG. 3.

In Step S1101 of the processing for computing a space-heating measure, the vehicle controller 19 computes an amount of power Q for meeting the space-heating request, considering a currently set interior temperature, an outside-air temperature, and the like.

In Step S1102, for the space-heating while charging, the vehicle controller 19 computes an amount of power generation (output of the power generator) in a case of performing space-heating with waste heat (space-heating which uses waste heat from the power generation unit PGU as the heat source of the heater core 11), the amount of power to be generated being computed from a characteristic chart in FIG. 10 to be described later. For the space-heating while not charging, being unable to decide on an operating point of power generation from charge power, the vehicle controller 19 computes an amount of power generation based on electric power or an amount of electric power acceptable by the battery at that time.

In Step S1103, from results of the computations in Step S1101 and Step S1102, the vehicle controller 19 computes a duration time T3 of space-heating with waste heat, which is necessary to supply heat needed to complete space-heating with the space-heating with waste heat. Further, in Step S1103, the vehicle controller 19 computes a time to start the space-heating with waste heat (timing to start the space-heating with waste heat) based on the T3 and a space-heating ending time (an expected space-heating completion time) determined based on the driver operation, settings, and the like read in Step S1002. This computation will be described later.

In Step S1104, the vehicle controller 19 computes a duration time T2 of space-heating with electric heater (space-heating which uses the electric heater 12 as the heat source of the heater core 11), which is necessary to supply heat needed to complete space-heating with the electric heater 12. Further, in Step S1104, the vehicle controller 19 computes a time to start the space-heating with electric heater (timing to start the space-heating with electric heater) based on the space-heating ending time and the T2 described above.

In Step S1105, the vehicle controller 19 determines whether the space-heating can be completed only with the electric heater or not, based on such conditions as a space-heating capability of the electric heater 12 and the outside-air temperature detected by the outside-air temperature detector 20. The vehicle controller 19 proceeds the processing to Step S1106 if determining that the space-heating can be completed with only the electric heater 12, and proceeds the processing to Step S1108 if determining that the space-heating cannot be completed with only the electric heater 12. Under an extremely-low temperature condition where the detected outside-air temperature is lower than a predetermined temperature and therefore sufficient space-heating cannot be achieved with only the electric heater 12, the vehicle controller 19 determines that the space-heating cannot be completed with only the electric heater 12 and selects the space-heating with waste heat.

Figure 8:
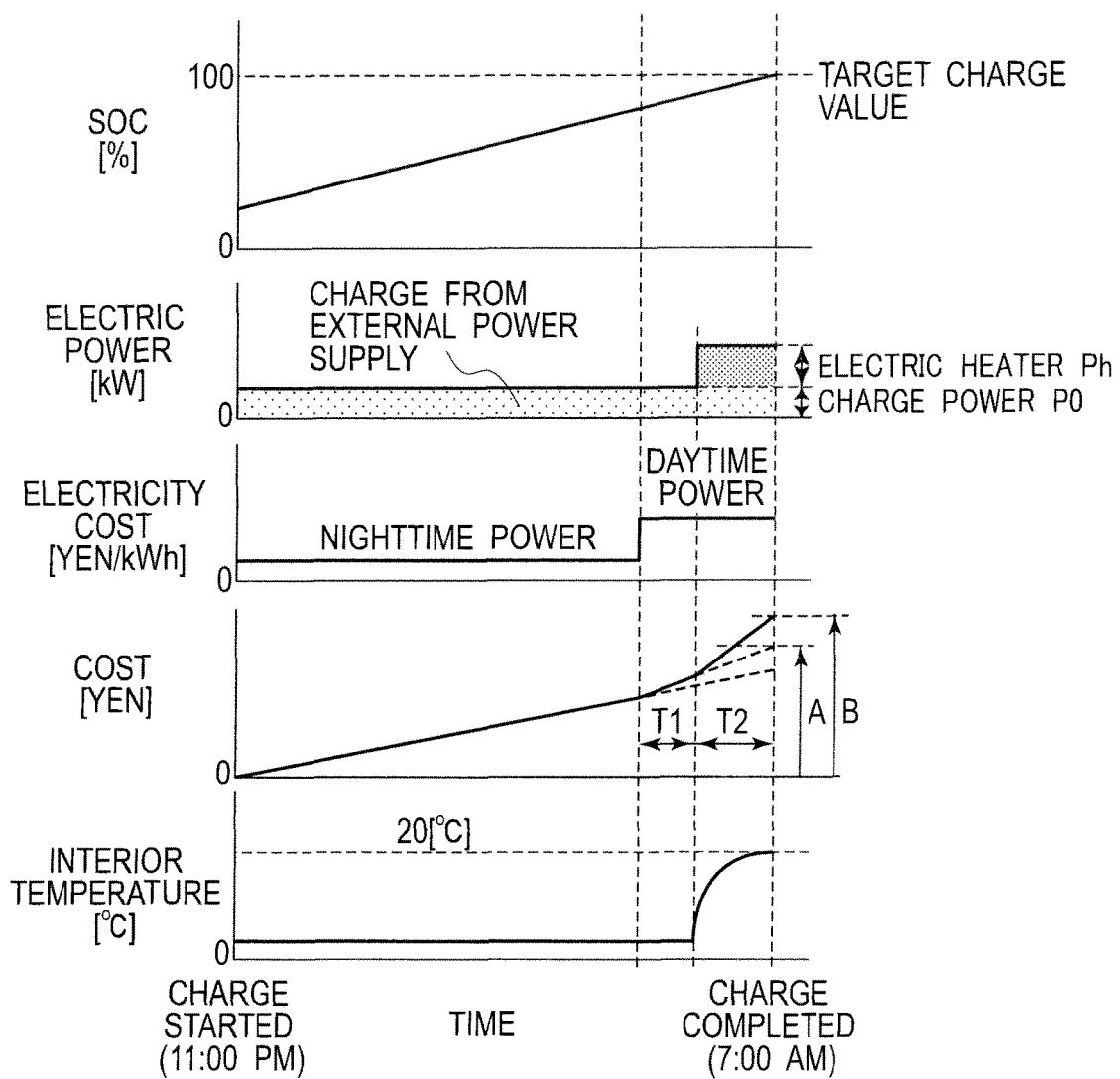
FIG. 8 is a time chart showing an example of using an electric heater as a heat source of a heater core when a driver of the electric automobile in FIG. 1 requests that space-heating be completed simultaneously with completion of charging.
Figure 9:
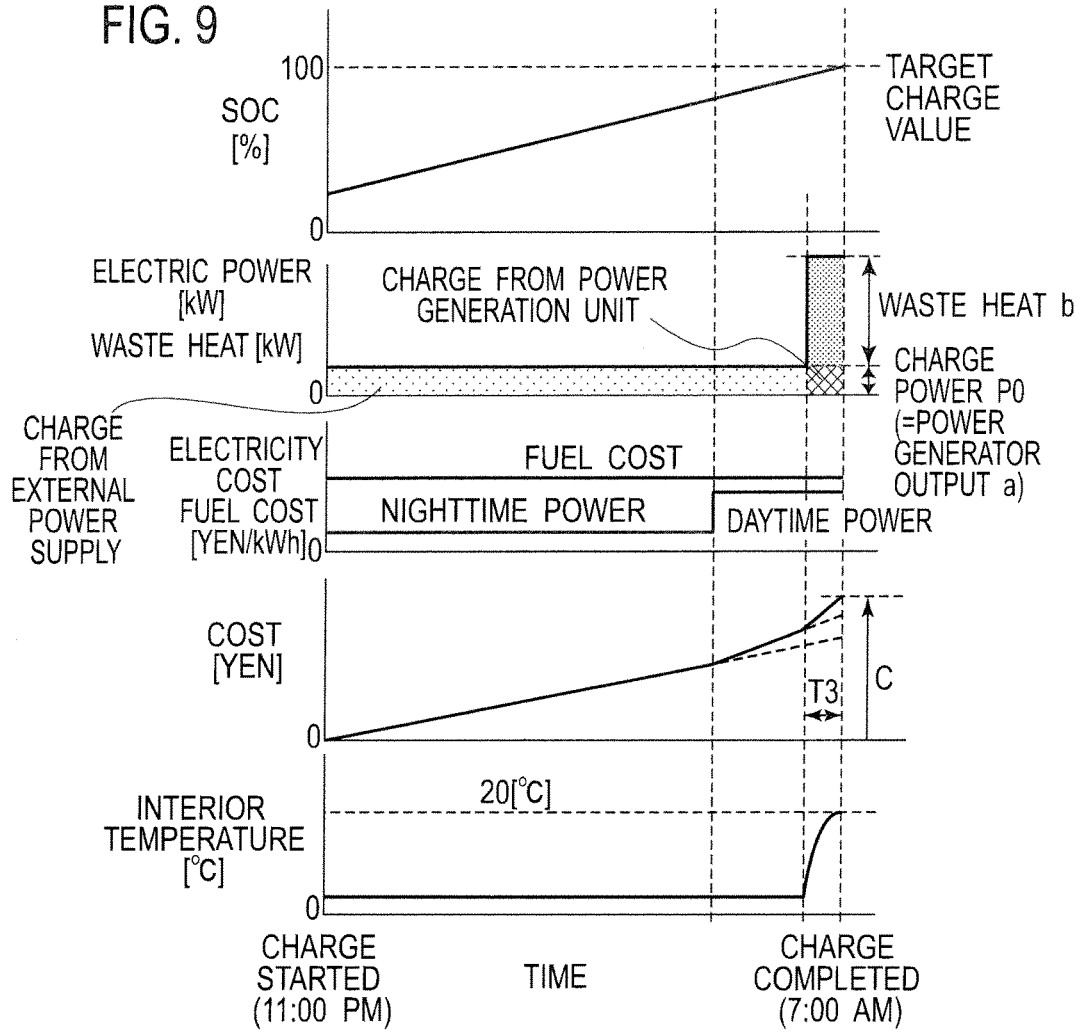
FIG. 9 is a time chart showing an example of using waste heat from a power generation unit as the heat source of the heater core when a driver of the electric automobile in FIG. 1 requests that space-heating be completed simultaneously with completion of charging.

In Step S1106, the vehicle controller 19 computes a space-heating cost (energy cost) for each of a case of using only the electric heater 12 as the heat source of the heater core 11 (a case of using power from the external power source EPS as the heat source) and a case of using waste heat from the power generation unit PGU (a case of using waste heat from the power generation unit PGU as the heat source). Examples of cost for space-heating in each of those cases will be described later (FIGS. 8 and 9). In this processing in Step S1106, the vehicle controller 19 functions as an energy cost computer.

In Step S1107, the vehicle controller 19 determines whether or not the cost for the space-heating with the electric heater 12 is higher than the cost for the space-heating with waste heat. If the cost for the space-heating with the electric heater 12 is higher than the cost for the space-heating with waste heat, the vehicle controller 19 proceeds the processing to Step S1108. If the cost for the space-heating with the electric heater 12 is equal to or lower than the cost for the space-heating with waste heat, the vehicle controller 19 proceeds the processing to Step S1109 to select the space-heating with the electric heater 12, and ends the processing.

If the space-heating is to be performed with waste heat from the power generation unit PGU, the vehicle controller 19 performs Step S1108 in which it computes a constraint condition if there should be a constraint condition for power generation, such as limiting the amount of power generation in order to reduce noise produced by the power generator (i.e., if the power generation performance is to be limited). In Step S1110, the vehicle controller 19 determines whether or not the space-heating can be completed with waste heat within the range of the constraint condition obtained in Step S1108. If determining that the space-heating can be completed, the vehicle controller 19 proceeds the processing to Step S1111 to select the space-heating with waste heat from the power generation unit PGU, and ends the processing. The constraint condition for power generation described above may be appropriately set according to a current heat environment or the like, or may be set in advance. In this processing in Step S1108 and S1110, the vehicle controller 19 functions as a power generation performance limit determination unit.

If determining in Step S1110 that the space-heating cannot be completed with waste heat within the range of the constraint condition obtained in Step S1108, the vehicle controller 19 proceeds the processing to Step S1112 to select both the space-heating with waste heat and the space-heating with electric heater, and ends the processing.

<Processing for Space-Heating while Charging>

Figure 5A:
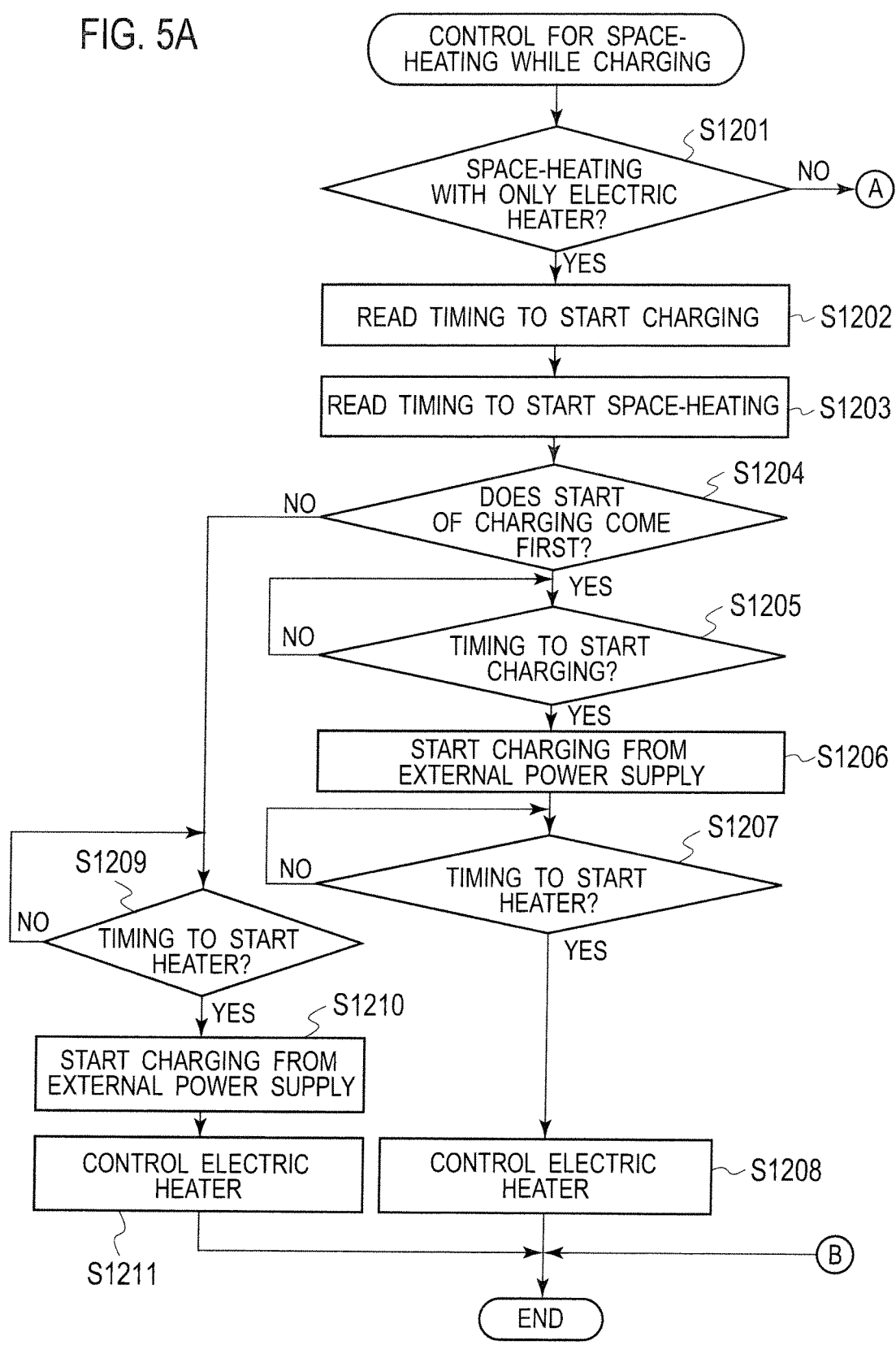
FIG. 5A is a flowchart illustrating processing for "space-heating while charging" in FIG. 3.
Figure 5B:
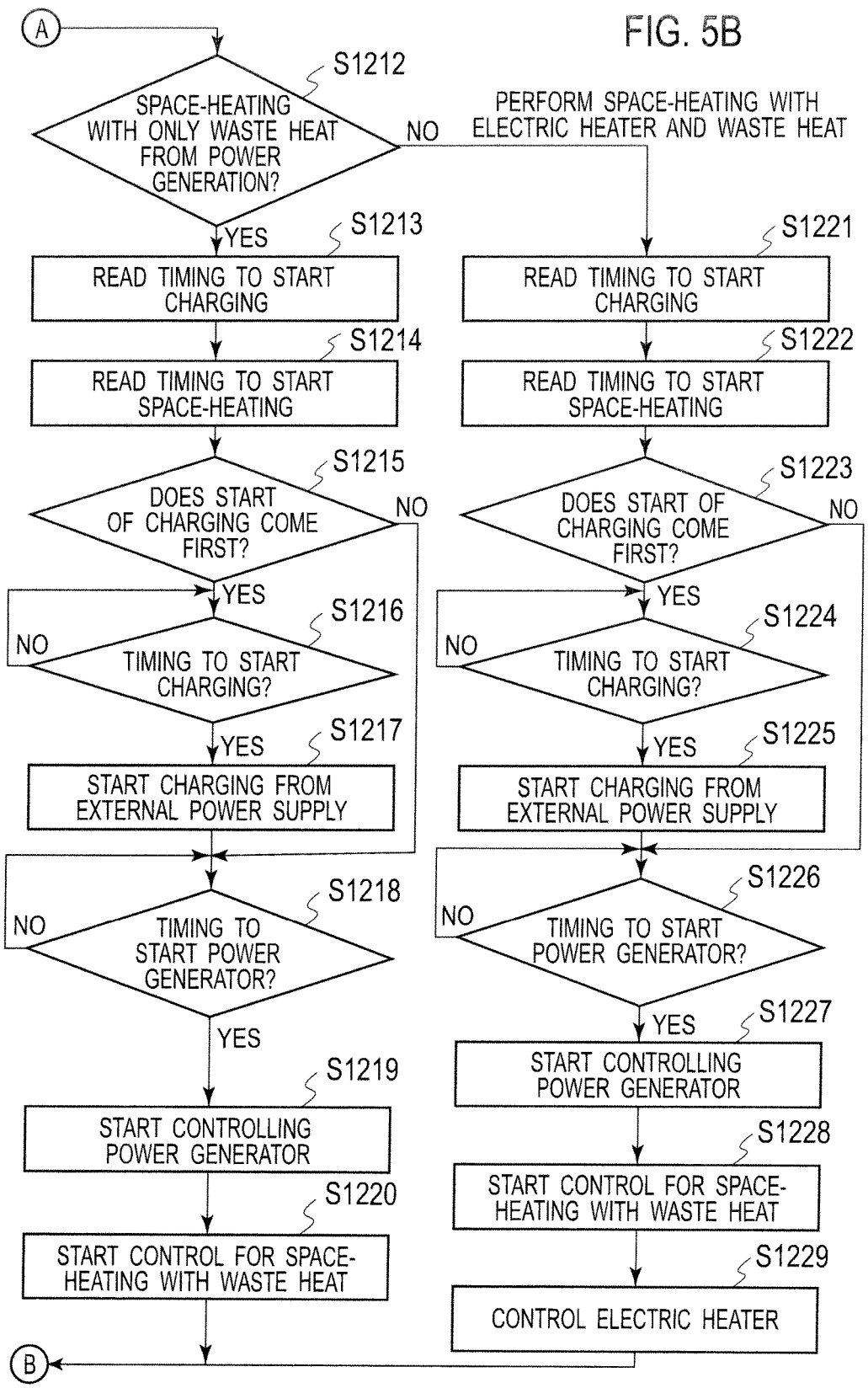
FIG. 5B is a flowchart illustrating processing for "space-heating while charging" in FIG. 3.

FIGS. 5A and 5B are flowcharts showing processing for the space-heating while charging according to the embodiment of the present invention. Specifically, FIGS. 5A and 5B are flowcharts showing a procedure of Step S1008 in the flowchart of FIG. 3.

In Step S1201 of the processing for the space-heating while charging, the vehicle controller 19 determines whether the space-heating with only the electric heater 12 is selected or not. The vehicle controller 19 proceeds the processing to Step S1202 if the space-heating with only the electric heater 12 is selected, and proceeds the processing to Step S1212 if the space-heating with only the electric heater 12 is not selected.

The vehicle controller 19 in Step S1202 reads a timing to start charging, and in Step S1203 reads the timing to start the space-heating with the electric heater 12 computed in the flowchart of FIG. 4.

In Step S1204, the vehicle controller 19 determines whether the start of charging comes before the start of space-heating or not. The vehicle controller 19 proceeds the processing to Step S1205 if the start of charging comes first, and proceeds the processing to Step S1209 if the start of charging does not come first.

In Step S1205, the vehicle controller 19 determines whether the timing to start charging has been reached or not. The vehicle controller 19 repeats Step S1205 if the timing to start charging has yet to be reached, and proceeds to Step S1206 if the timing to start charging has been reached.

In Step S1206, the vehicle controller 19 starts charging from the external power source EPS, and then proceeds the processing to Step S1207.

In Step S1207, the vehicle controller 19 determines whether the timing to start the space-heating with electric heater has been reached or not. The vehicle controller 19 repeats Step S1207 if the timing to start the space-heating with electric heater has yet to be reached, and proceeds the processing to Step S1208 if the timing to start the space-heating with electric heater has been reached. In Step S1208, the vehicle controller 19 starts control for the space-heating with the electric heater 12, and then ends the processing.

If determining in Step S1204 that the start of charging does not come first, the vehicle controller 19 determines in Step S1209 whether the timing to start the space-heating with electric heater has been reached or not. The vehicle controller 19 repeats Step S1209 if the timing to start the space-heating with electric heater has yet to be reached, and proceeds the processing to Step S1210 if the timing to start the space-heating with electric heater has been reached. The vehicle controller 19 starts charging from the external power source EPS in Step S1210, then starts control for the space-heating with the electric heater 12 in subsequent Step S1211, and then ends the processing.

If it is determined in Step S1201 that the space-heating with only the electric heater 12 is not selected, the vehicle controller 19 proceeds the processing to Step S1212. In Step S1212, the vehicle controller 19 determines whether the space-heating with only waste heat from the power generation unit PGU (waste heat from power generation) is selected or not. The vehicle controller 19 proceeds the processing to Step S1213 if the space-heating with only waste heat from the power generation unit PGU is selected, and proceeds the processing to Step S1221 if not.

The vehicle controller 19 in Step S1213 reads a timing to start charging, and in Step S1214 reads the timing to start the space-heating with waste heat computed in the flowchart of FIG. 4.

In Step S1215, the vehicle controller 19 determines whether the start of charging comes before the start of space-heating or not. The vehicle controller 19 proceeds the processing to Step S1216 if the start of charging comes first, and proceeds the processing to Step S1218 if not.

In Step S1216, the vehicle controller 19 determines whether the timing to start charging has been reached or not. The vehicle controller 19 repeats Step S1216 if the timing to start charging has yet to be reached, and proceeds the processing to Step S1217 if the timing to start charging has been reached.

In Step S1217, the vehicle controller 19 starts charging from the external power source EPS, and then proceeds the processing to Step S1218.

In Step S1218, the vehicle controller 19 determines whether the timing to start the space-heating with waste heat from the power generation unit PGU has been reached or not. The vehicle controller 19 repeats Step S1218 if the timing to start the space-heating with waste heat has yet to be reached, and proceeds the processing to Step S1219 if the timing to start the space-heating with waste heat has been reached. The vehicle controller 19 starts controlling power generation by the power generator 8 in Step S1219, then starts control for the space-heating with waste heat from the power generation unit PGU in Step S1220, and then ends the processing.

If it is determined in Step S1212 that the space-heating with only waste heat from the power generation unit PGU is not selected, the vehicle controller 19 proceeds the processing to Step S1221. Then, the vehicle controller 19 in Step S1221 reads a timing to start charging, and then in Step S1222 reads the timing to start the space-heating with waste heat computed in the flowchart of FIG. 4.

In Step S1223, the vehicle controller 19 determines whether the start of charging comes before the start of space-heating or not. The vehicle controller 19 proceeds the processing to Step S1224 if the start of charging comes first, and proceeds the processing to Step S1226 if the start of charging does not come first.

In Step S1224, the vehicle controller 19 determines whether the timing to start charging has been reached or not. The vehicle controller 19 repeats Step S1224 if the timing to start charging has yet to be reached, and proceeds the processing to Step S1225 if the timing to start charging has been reached.

In Step S1225, the vehicle controller 19 starts charging from the external power source EPS, and then proceeds the processing to Step S1226.

In Step S1226, the vehicle controller 19 determines whether the timing to start the space-heating with waste heat from the power generation unit PGU has been reached or not. The vehicle controller 19 repeats Step S1226 if the timing to start the space-heating with waste heat has yet to be reached, and proceeds to Step S1227 if the timing to start the space-heating with waste heat has been reached. In Step S1227, the vehicle controller 19 starts controlling power generation by the power generator 8, then starts control for the space-heating with waste heat from the power generation unit PGU in Step S1228, and then also starts control for the space-heating with the electric heater 12 in Step S1229. Then, the processing is ended.

<Processing for Controlling Space-Heating while not Charging>

Figure 6:
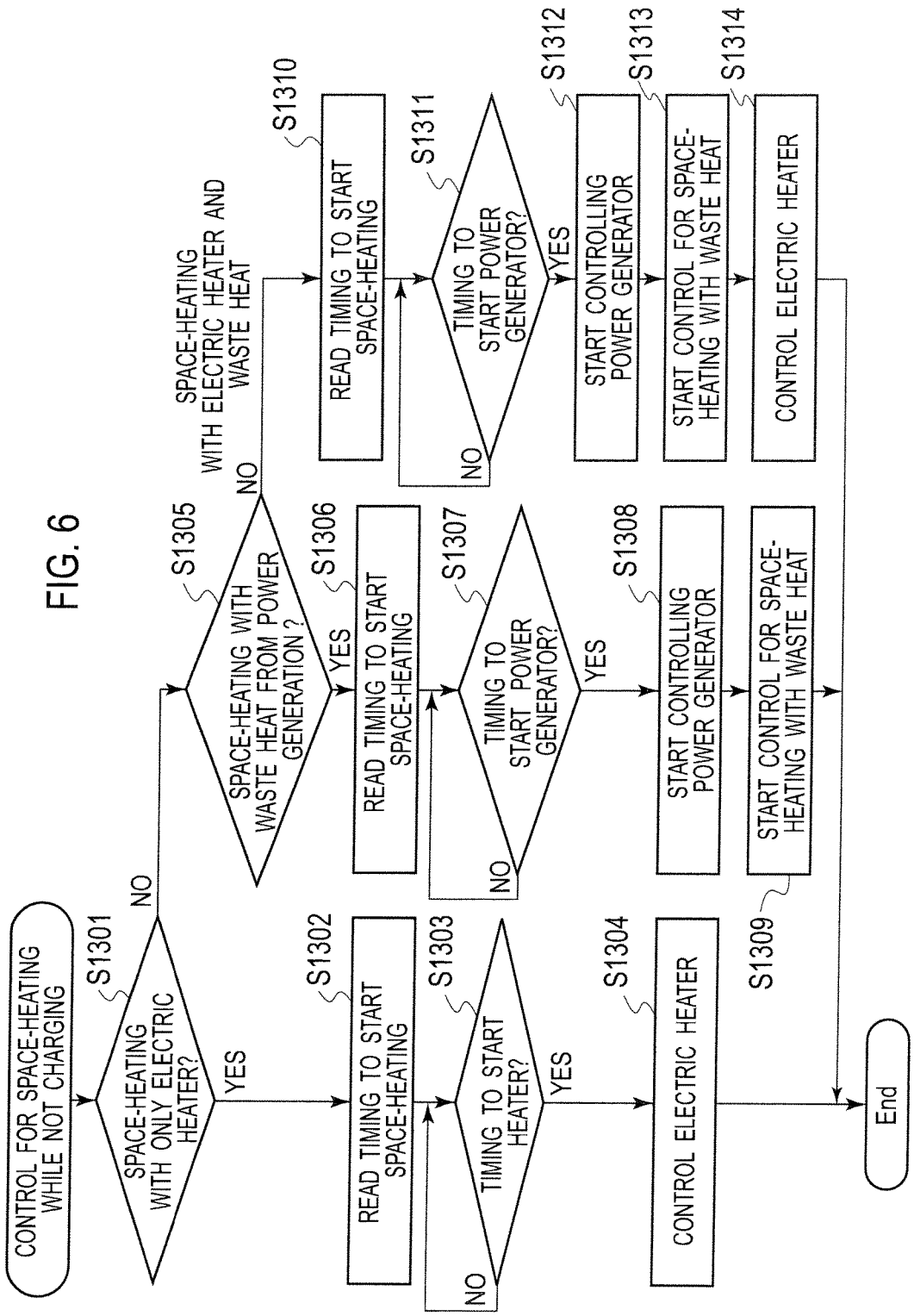
FIG. 6 is a flowchart illustrating processing for "space-heating while not charging" in FIG. 3.

FIG. 6 is a flowchart showing processing for controlling the space-heating while not charging according to the embodiment of the present invention. Specifically, FIG. 6 is a flowchart showing the procedure performed in Step S1010 in the flowchart of FIG. 3.

In Step S1301 of the processing for controlling the space-heating while not charging, the vehicle controller 19 determines whether the space-heating with only the electric heater 12 is selected or not. Then, the vehicle controller 19 proceeds the processing to Step S1302 if the space-heating with only the electric heater 12 is selected, and proceeds the processing to Step S1305 if not. In Step S1302, the vehicle controller 19 reads the timing to start the space-heating with the electric heater 12 computed in the flowchart in FIG. 4. In Step S1303, the vehicle controller 19 determines whether the timing to start the space-heating with electric heater has been reached or not. The vehicle controller 19 repeats Step S1303 if the timing to start the space-heating with electric heater has yet to be reached, and proceeds the processing to Step S1304 if the timing to start the space-heating with electric heater has been reached. In Step S1304, the vehicle controller 19 starts control for the space-heating with the electric heater 12, and thereafter ends the processing.

In Step S1305, the vehicle controller 19 determines whether the space-heating with only waste heat from the power generation unit PGU is selected or not. The vehicle controller 19 proceeds the processing to Step S1306 if the space-heating with only waste heat from the power generation unit PGU is selected, and proceeds the processing to Step S1310 if not.

In Step S1306, the vehicle controller 19 reads the timing to start the space-heating with waste heat computed in the flowchart in FIG. 4.

In Step S1307, the vehicle controller 19 determines whether the timing to start the space-heating with waste heat from the power generation unit PGU has been reached or not. The vehicle controller 19 repeats Step S1307 if the timing to start the space-heating with waste heat has yet to be reached, and proceeds the processing to Step S1308 if the timing to start the space-heating with waste heat has been reached. The vehicle controller 19 starts controlling power generation by the power generator 8 in Step S1308, then starts control for the space-heating with waste heat from the power generation unit PGU in Step S1309, and ends the processing.

If it is determined in Step S1305 that the space-heating with only waste heat from the power generation PGU has not been selected, the vehicle controller 19 proceeds the processing to Step S1310, where it reads the timing to start the space-heating with waste heat computed in the flowchart in FIG. 4.

In Step S1311, the vehicle controller 19 determines whether the timing to start the space-heating with waste heat from the power generation unit PGU has been reached or not. The vehicle controller 19 repeats Step S1311 if the timing to start the space-heating with waste heat has yet to be reached, and proceeds the processing to Step S1312 if the timing to start the space-heating with waste heat has been reached. The vehicle controller 19 starts controlling power generation by the power generator 8 in Step S1312, starts control for the space-heating with waste heat from the power generation unit PGU in Step S1313, and also starts control for the space-heating with the electric heater 12 in Step S1314. Then, the processing is ended.

Figure 7:
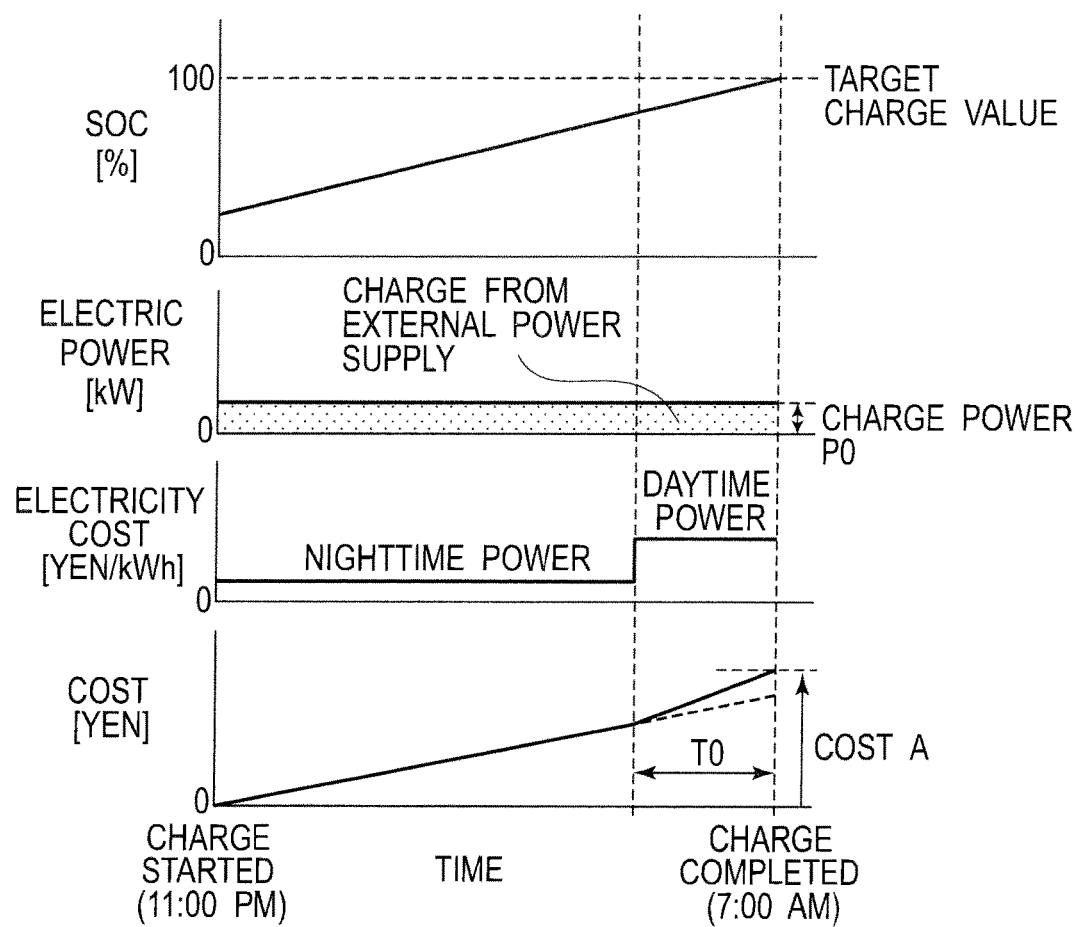
FIG. 7 is a time chart showing a general example of charging the electric automobile in FIG. 1 when the automobile is parked.

FIG. 7 is a time chart showing a general example of charging the electric automobile equipped with power generation unit according to this embodiment while the automobile is parked. For example, suppose that, before getting out, a driver sets such information in the vehicle that the vehicle will be used after 7:00 a.m. the next day (the day of departure). Then, the vehicle controller 19 controls the charger 5 so that charge of the high-voltage battery 3 may be started at 11:00 p.m. that day (the day before the day of departure) and completed at 7:00 a.m. the next day (the day of departure). The high voltage battery 3 is charged with a constant charge power P0. Since the system power includes nighttime power for which the unit price of electricity is relatively low and daytime power for which unit price of electricity is relatively high, the cumulative energy cost (electricity cost) follows the course as shown at the lowermost chart in FIG. 7 if the charge power P0 is constant. Specifically, the cumulative energy cost increases at a relatively high increasing rate after the switch from the nighttime power to the daytime power (during time T0). Then, when the cumulative energy cost finally reaches cost A, the required charge is completed.

FIG. 8 is a time chart showing an example of using the electric heater 12 as the heat source of the heater core 11 when a driver of the electric automobile equipped with power generation unit according to this embodiment requests that space-heating be completed simultaneously with completion of charging. In this ease, for example, suppose that the driver, before getting out, sets such information in the vehicle that the vehicle will be used after 7:00 a.m. the next day (the day of departure). The vehicle controller 19 determines based on the driver's intension on space-preheating that an expected space-preheating completion time is 7:00 a.m. the next day, and controls the charger 5 so that charge of the high-voltage battery 3 may be started at 11:00 p.m. that day (the day before the day of departure) and completed at 7:00 a.m. the next day (the day of departure). In this example, to accomplish the requested space-heating, electric power is used also for space-heating for a period of the time T2, which starts from a point before the expected space-preheating completion time (7:00 a.m.) by the period of the time T2 (a point after the elapse of a time T1 since the switch from the nighttime power to the daytime power). Consequently, the cumulative energy cost (electricity cost) results in cost B which is higher than cost A mentioned above. If the electric automobile equipped with power generation unit is heated while in regular operation, the heat energy from the power generator 8 and the engine 10 (engine coolant water) can be used for the space-heating, and thus a capacity Ph of the electric heater 12 is set to be somewhat smaller than that of an electric automobile not equipped with power generation unit. For this reason, when only the electric heater 12 is used to perform desired space-heating for a parked vehicle, space-heating needs to be performed for a relatively long time (T2). The amount of heat dissipated to the outside air during that time is relatively high, which consequently lowers the space-heating efficiency and results in the relatively high cumulative energy cost (electricity cost) B.

FIG. 9 is a time chart showing an example of using waste heat from the power generation unit PGU as the heat source of the heater core 11 when a driver of the electric automobile equipped with power generation unit according to this embodiment requests that space-heating be completed simultaneously with completion of charge. In this case, by using not the electric heater 12 but the waste heat from the power generator 8 and the engine 10 (engine coolant water), the space-heating is completed with a shorter time. Specifically, the space-heating is performed only for a period of a time T3 which is shorter than the time T2 from a point before the expected space-preheating completion time by the period of the time T3 (<T2).

Here, assume that power is generated by the power generator 8 driven by the engine 10 using gasoline as a fuel, and a comparison is made between a fuel cost for obtaining a predetermined amount of electric power and an electricity cost for obtaining the same amount of electric power. Then, as shown in FIG. 9, the fuel cost tends to be higher. However, if the charge power P0 is not obtained from the external power source EPS but generated by the power generator 8 driven by the engine 10, and waste heat from this power generation is used for space-heating, the space-heating can be covered by the fuel cost for the charge. Thereby, the costs are reduced in many scenes, and a time required for the space-heating is shortened, which is advantageous against the heat dissipation problem. Total energy cost can thus be reduced. In the above example, as shown at the bottom in FIG. 9, the charging and the space-heating (set at a temperature of 20° C.) can be completed simultaneously at the cumulative energy cost of cost C (<B). Thus, cost reduction is accomplished. Note that how to obtain information such as the unit price of fuel and the unit price of electricity are not particularly limited, and they can be obtained by for example using an additional communication device or the like.

Figure 10:
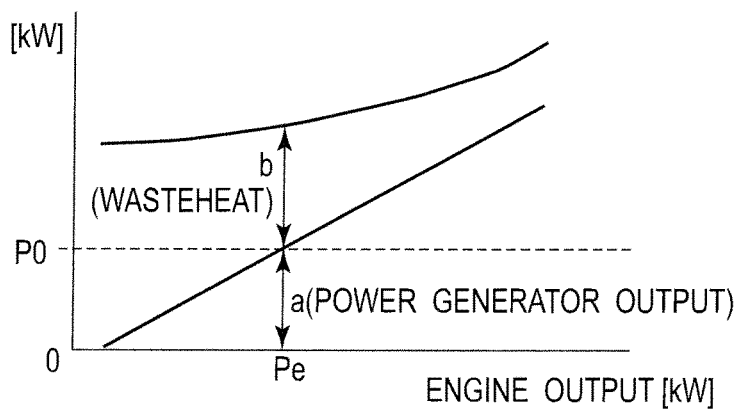
FIG. 10 is a characteristic chart showing a relation between an output of a power generator and waste heat usable for space-heating, with respect to an output of an engine, according to the embodiment of the present invention.

FIG. 10 shows a relation between an output of the power generator and waste heat usable for space-heating, with respect to an output of the engine. The length of the time T3 in FIG. 9 is determined based on FIG. 10. Specifically, the time T3 is determined by determining an engine output Pe at which a power generator output "a" equals the charge power P0 (a=P0) and then determining how much time is needed to supply a necessary amount of heat energy with the space-heating with waste heat "b" at the engine output Pe.

The apparatus for controlling vehicle according to this embodiment can offer the following advantageous effects.

(1) The apparatus for controlling a vehicle includes: the high-voltage battery 3 (a battery) capable of being charged from the external power source EPS; the power generation unit PGU capable of charging the high-voltage battery 3; the electric heater 12 configured to produce heat by electric power from a power source such as, for example, the external power source EPS, the high-voltage battery 3, or the power generation unit PGU; the heater core 11 configured to heat air by using any one of waste heat from the power generation unit PGU and the electric heater 12; and the vehicle controller 19 (a controller) configured to perform control for selectively using the waste heat from the power generation unit PGU and the electric heater 12 as a heat source of the heater core 11 when the vehicle is parked.

Thus, by performing space-heating with the waste heat from the power generation unit PGU which has larger energy than the electric heater 12, a sufficient space-heating effect can be obtained.

(2) The vehicle controller 19 starts the power generation unit PGU and uses the waste heat from the power generation unit PGU as the heat source of the heater core 11.

Thus, the space-heating effect can be obtained with a short time.

(3) The vehicle controller 19 causes the power generation unit PGU to charge the high-voltage battery 3.

Thus, while necessary charging is performed by the power generator 8, the space-heating can be performed using the waste heat which is energy lost upon the charging. Thereby, a sufficient space-heating effect can be obtained efficiently with a short time.

(4) The apparatus includes the space-preheating request determination unit 102 configured to determine an expected completion time of space-preheating which is based on a driver's intention on the space-preheating, and the vehicle controller 19 starts the power generation unit PGU a predetermined time period before the expected completion time of space-preheating (see Step S1103).

Thus, heat dissipated during the space-heating can be minimized, and a time for which the power generation unit PGU makes noise while the vehicle is parked can be minimized, too. Thereby, a sufficient space-heating effect can be obtained with a short time.

(5) In Step 1106, the vehicle controller 19 computes an energy cost for a case of using the waste heat from the power generation unit PGU as the heat source and an energy cost for a case of using electric power from the external power source EPS as the heat source (the energy cost computer), and performs control so that the heat source of the smaller one of the computed energy costs is employed.

Thus, by selecting the heat source of the smaller energy cost, a sufficient space-heating effect can be obtained while achieving cost reduction.

(6) The apparatus includes the outside-air temperature detector 20 configured to detect an outside-air temperature, and the vehicle controller 19 uses the waste heat from the power generation unit PGU as the heat source of the heat core 11 when the detected outside-air temperature is lower than a predetermined temperature in Step S1105.

Thus, even when the temperature is too low to achieve sufficient space-heating with the electric heater 12, a sufficient space-heating effect can be obtained by selecting the space-heating with waste heat.

(7) The vehicle controller 19 determines in Step S1108 whether to limit the power generation performance of the power generation unit PGU or not (the power generation performance limit determination unit), and if determining that the power generation performance is to be limited, uses both the waste heat from the power generation unit PGU and the electric heater 12 as the heat source of the heater core 11 in Step S1110.

Thus, even when the capability of the electric heater 12 is insufficient and when the space-heating with waste heat from the power generation unit PGU needs to be limited due to a constraint condition for noise or the like, selecting both the waste heat and the electric heater 12 as the heat source allows a sufficient space-heating effect to be obtained even under a low outside-air temperature, while suppressing produced noise.

The embodiment of the present invention has been described above. However, the embodiment is merely an example given to facilitate an easy understanding of the present invention, and the present invention is not limited to the embodiment. The technical scope of the present invention is not limited to the specific technical matters disclosed in the above embodiment, but includes various modifications, changes, alternative techniques, and the like which can be led therefrom. For example, in the example described in the above embodiment, space-heating is performed with waste heat from the power generation unit generating electric power while using the electric power for charging. Instead, the method may be for performing the space-heating with waste heat from the power generation unit generating electric power while not using the electric power for charging but consuming it. Specifically, when the space-heating is performed by using both the electric heater 12 and the waste heat, the above measure can be achieved by using all the generated electric power for the electric heater 12.

The space-heating with the electric heater 12 or the waste heat from the power generation unit PGU in the present application includes not only heating the driver compartment but also heating system components (e.g., a battery and the like), of course.

Moreover, preliminary air-conditioning to which the apparatus and method for controlling vehicle according to the present invention are applicable is not limited to space-preheating, but of course includes precooling. For example, the concept of the present invention can be applied to a control device configured to perform control by determining whether to use electric energy or to use kinetic energy of the engine which is the power generation unit PGU, as a source of energy for powering a compressor used in a refrigerating cycle. In such a case, the compressor is connected to an electric motor and the engine via a clutch and the like, and may switch its power source appropriately.

The present application claims the benefit of priority from Japanese Patent Application Publication No. 2010-286885 filed on Dec. 24, 2010, the entire contents of which are incorporated herein by reference.

INDUSTRIAL APPLICABILITY

The apparatus and method for controlling a vehicle performs control of selectively using the waste heat from the power generation unit and the electric heater as the heat source of the heater core while the vehicle is parked. Thereby, heating air can be performed using not only the electric heater but also the waste heat from the power generation unit while the vehicle is parked. A sufficient space-heating can thus be achieved.

REFERENCE SIGNS LIST 1 drive motor
2 inverter
3 high-voltage battery
4 coolant water pump
5 charger
6 connecting device
7 radiator for heavy-current devices
8 power generator
9 inverter
10 engine
11 heater core
12 electric heater
13 coolant water pump
14 radiator for engine
15 engine control device
16 power generator control device
17 high-voltage battery control device
18 motor control device
19 vehicle controller

The invention claimed is:

1. An apparatus for controlling a vehicle, comprising:
a battery capable of being charged from an external power source;
a power generation unit capable of charging the battery;
an electric heater configured to produce heat with electric power supplied thereto;
a heater core configured to heat air by using any one of waste heat from the power generation unit and the heat produced by the electric heater;
an outside-air temperature detector configured to detect an outside-air temperature; and
a controller configured to determine whether the vehicle is parked and perform control for selectively using the waste heat from the power generation unit and the heat produced by the electric heater as a heat source of the heater core when it is determined that the vehicle is parked,
wherein the controller is configured to determine, based on the outside-air temperature detected by the outside-air temperature detector, whether or not a space-heating can be completed only with the electric heater, and
wherein the controller is configured to use the waste heat from the power generation unit as the heat source of the heater core when the detected outside-air temperature is lower than a predetermined temperature.

2. The apparatus for controlling a vehicle according to claim 1, wherein the controller is configured to start the power generation unit and use the waste heat from the power generation unit as the heat source of the heater core.

3. The apparatus for controlling a vehicle according to claim 2, wherein the controller is configured to cause the power generation unit to charge the battery.

4. The apparatus for controlling a vehicle according to claim 2, further comprising a space-preheating request determination unit configured to determine an expected completion time of space-preheating which is set by a driver,
wherein the controller is configured to start the power generation unit at a predetermined time before the expected completion time of space-preheating.

5. The apparatus for controlling a vehicle according to claim 1, comprising an energy cost computer configured to compute an energy cost for a case of using the waste heat from the power generation unit as the heat source and an energy cost for a case of using the electric power from the external power source as the heat source, wherein
the controller is configured to perform control such that the heat source having a smaller energy cost is employed.

6. The apparatus for controlling a vehicle according to claim 1, comprising a power generation performance limit determination unit configured to determine whether or not to limit power generation performance of the power generation unit, wherein
when it is determined that the power generation performance is to be limited, the controller is configured to use both the waste heat from the power generation unit and the heat produced by the electric heater as the heat source of the heater core.

7. A method for controlling a vehicle, comprising:
providing
a battery capable of being charged from an external power source,
a power generation unit capable of charging the battery, an electric heater configured to produce heat with electric power supplied thereto, and a heater core configured to heat air by using any one of waste heat from the power generation unit and the heat produced by the electric heater;

detecting an outside-air temperature with an outside-air temperature detector;

determining whether the vehicle is parked; and performing control for selectively using the waste heat from the power generation unit and the heat produced by the electric heater as a heat source of the heater core when it is determined that the vehicle is parked, determining, based on the outside-air temperature detected by the outside-air temperature detector, whether or not a space-heating can be completed only with the electric heater; and using the waste heat from the power generation unit as the heat source of the heater core when the detected outside-air temperature is lower than a predetermined temperature.

8. An apparatus for controlling a vehicle, comprising:

means for storing electric power capable of being charged from an external power source;

means for generating electric power capable of charging the means for storing electric power;

heat producing means for producing heat with electric power supplied thereto;

air heating means for heating air by using any one of waste heat from the means for generating electric power and the heat produced by the heat producing means;

outside-air temperature detecting means for detecting an outside-air temperature; and control means for determining whether the vehicle is parked and performing control for selectively using the waste heat from the means for generating electric power and the heat produced by the heat producing means as a heat source of the air heating means when it is determined that the vehicle is parked, wherein the control means is configured to determine, based on the outside-air temperature detected by the outside-air temperature detecting means, whether or not a space-heating can be completed only with the heat producing means, and wherein the control means is configured to use the waste heat from the means for generating electric power as the heat source of the air heating means when the detected outside-air temperature is lower than a predetermined temperature.

* * * * *